United States Patent [19]

Porter et al.

[11] Patent Number: 6,159,715
[45] Date of Patent: *Dec. 12, 2000

[54] METHOD FOR PROCESSING OILSEED MATERIAL

[75] Inventors: Michael A. Porter, Maple Grove; Alison M. Jones, Minnetonka; Dean A. Duncan, Mound; Michael D. Kluetz, Maple Plain, all of Minn.

[73] Assignee: Cargill, Inc., Minneapolis, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 09/078,878

[22] Filed: May 14, 1998

[51] Int. Cl.$^7$ ............................... C12P 1/04; C12N 1/00; A61K 35/78; A23L 1/202

[52] U.S. Cl. ..................... 435/170; 435/243; 424/195.1; 424/115; 426/46; 426/44; 426/52

[58] Field of Search ................................ 424/195.1, 115; 426/46, 44, 52; 435/243, 170

[56] References Cited

U.S. PATENT DOCUMENTS

| | | | |
|---|---|---|---|
| 1,332,448 | 3/1920 | Satow | 426/46 |
| 2,967,108 | 1/1961 | Smith et al. | 426/46 |
| 3,810,997 | 5/1974 | Chien . | |
| 3,876,807 | 4/1975 | Wagner et al. | 426/46 |
| 3,958,015 | 5/1976 | Gay . | |
| 4,028,470 | 6/1977 | Hayashi et al. | 426/11 |
| 4,110,477 | 8/1978 | Naruse et al. | 426/46 |
| 4,431,736 | 2/1984 | Romesser . | |
| 4,551,335 | 11/1985 | Canella et al. . | |
| 5,100,679 | 3/1992 | Delrue . | |
| 5,244,790 | 9/1993 | Kim | 435/42 |

FOREIGN PATENT DOCUMENTS 04 342 576   11/1992   Japan .

OTHER PUBLICATIONS

Anderson, R. et al., "Compositional Changes in Trypsin Inhibitors, Phytic Acid, Saponins and and Isoflavones Related to Soybean Processing", *American Institute of Nutrition*, Supplement pp. 581S–588S (1995).

Antony, U. et al., "Effect of Fermentation on the Primary Nutrients in Finger Millet (Eleusine coracana)", *J. Agric. Food Chem.*, 44:2616–2618 (1996).

Cook, P., "Fermented foods as biotechnological resources", *Food Research International*, 27:309–316 (1994).

Demetrakakes, P., "Quality for the ages", *Food Processing*, pp. 61–62; 65–66 (Sep. 1996).

de Reu, J. et al., "Protein Hydrolysis during Soybean Tempe Fermentation with *Rhizopus oligosporus*", *J. Agric. Food Chem.*, 43:2235–2239 (1995).

Duszkiewicz–Reinhard, W. et al., "Reduction of Stachyose in Legume Flours by Lactic Acid Bacteria", *Jour. of Food Sci.*, 59:115–117 (1994).

Ebine, H., "Fermented Soybean Foods", Asian Conference, No. 10 (1976).

Ebune, A. et al., "Effects of Phosphate, Surfactants and Glucose on Phytase Production and Hyrrolysis of Phytic Acid in Canola Meal by *Aspergillus Ficuum* During Solid–State Fermentation", *Bioresource Technology*, 54:241–247 (1995).

Ebune, A. et al., "Production of Phytase During Solid State Fermentation Using *Aspergillus Ficuum* NRRL 3135 in Canola Meal", *Bioresource Techology*, 53:7–12 (1995).

Efiuvwevwere, B. et al., "Influence of Fermentation Time and an "Indigenous Tenderiser" (Kanwa) on the Microbial Profile, Chemical Attributes and Shelf–Life of Rice Masa (a Nigerian Fermented Product)", *J. Sci. Food Agric.*, 71:442–448 (1996).

Frias, J. et al., "Natural Fermentation of Lentils. Influence of Time, Flour Concentration, and Temperature on the Kinetics of Monosaccharides, Disaccharide, and α–Galactosides", *J. Agric. Food Chem.*, 44:579–584 (1996).

Fukushima, D.,"Soy Proteins for Foods Centering around Soy Sauce and Tofu", pp. 346–354 (Mar. 1981).

Golbitz, F., "Traditional Soyfoods: Processing and Products", *American Institute of Nutrition*, Supplement, pp. 570S–572S (1995).

Hachmeister, K. et al., "Tempeh: A Mold–Modified Indigenous Fermented Food Made from Soybean and/or Cereal Grains", *Critical Reviews in Microbiology*, 19(3):137–188 (1993).

Han, Y. et al., "Traditional Korean Fermented Foods (Review).", *Chem.Mikrobiol. Technol. Lebensm.*, 15 (5/6):150–160 (1993).

Kim et al., "Taste Components of Soy Sauce Manufacturing by Bacillus Species SSA3–2M1 and Fused ST723–F31", *Jour. of Microbio. and Biotech.*, 6:202–208 (1996).

Kim et al., Volatile Components in the Soy Sauce Manufactured by Bacillus Species and Fused Yeast, *Jour. of Microbio. and Biotech.*, 6:194–201 (1996).

Kumar, G. et al., "The effects of temperature and manganese on the natural fermentation of whole wheatflour", *Food Microbiology*, 13:149–157 (1996).

Liu, K., "Fermented Oriental Soyfoods", SOYBEANS Chemistry, *Technology, and Utilization*, pp. 273–281 (1997).

Luh, K., "Industrial production of soy sauce", *Journal of Industrial Microbiology*, 14:467–471 (1995).

(List continued on next page.)

Primary Examiner—Francisco Prats
Attorney, Agent, or Firm—Merchant & Gould P.C.

[57] ABSTRACT

A method for preparing the high protein nutrient from oilseed-based material is provided. The modified oilseed-based material produced by the process can be utilized in a wide variety of applications, including the preparation of fermentation media. The oilseed-based product typically includes at least about 55 wt. % protein (dry basis), low levels of soluble sugars, such as raffinose, stachyose and saccharose and has a FAN content of at least about 15 mg/g. Fermentation media and aqueous nutrient solutions derived from the modified oilseed material are also provided.

26 Claims, 3 Drawing Sheets

OTHER PUBLICATIONS

Maia, A. et al., "Protection of the Intracellular Trehalose Content by Corn and Soy Flours in Alcohol Fermentation", *Biotechnology Letters*, 15:715–720 (Jul. 1993).

Maruo, B. et al., "Industrial Application of *B. subtilis*", *Bacillus subtilis: Molecular Biology and Industrial Application*, pp. 143–161 (1989).

Mitra, P. et al., "Production of Proteolytic Enzymes by Solid State Fermentation—An Overview", *Jour. of Sci. & Ind. Research*, 55:439–442 (May–Jun. 1996).

Nout, M., "Fermented foods and food safety", *Food Research International* 27:291–298 (1994).

Ohta, T. et al., Manufacturing New–type Fermented Soybean Food Product Employing *Bacillus natto* Parts 1 & 2, *Report of the Food Research Institute No. 18*, (Mar. 1964). (With English Abstrate).

Prescott, et al., "Natto", *Ind. Microbiology*, 4th Ed. pp. 520–521 (1982).

Rexen, B., "Application of Enzymes in Feedstuff Industry", *Role and Utilization of Enzymes*, 4.2.3, (1978).

Röling, W. et al., "Comparison between Traditional Soy Sauce (Kecap) Fermentation in Indonesia", *Journal of Fermentation and Bioengineering*, 81:275–278 (1996).

Rozan, P. et al., "Detoxication of rapeseed meal by *Rhizopus Oligosporus sp–T3*: A first step towards rapeseed protein concentrate", *Intern. Jour. of Food Sci. and Tech.*, 31:85–90 (1996).

Ruiz–Terán, F. et al., "Chemical and Enzymic Changes During the Fermentation of Bacteria–Free Soya Bean Tempe", *J. Sci Food Agric.*, 71:523–530 (1996).

Wang, H. et al., "Oriental Fermented Foods", *Industrial Microbiology*, pp. 492–538 (date unknown).

Wang, H. et al., "Isoflavone Content in Commercial Soybean Foods", *J. Agric. Food Chem.* 42:1666–1673 (1994).

Wattanapat, R. et al., "Kinetics of Acid Hydrolysis of Defatted Peanut Flour", *Jour. of Food Sci.*, 59:621–625 (1994).

Beuchat, L., "Fermented Soybean Foods", Food Technolocy, vol. 38, No. 6, pp. 64–70 (Jun. 1984).

Parrado, J. et al., "Production of Soluble enzymatic Protein Hydrolysate from Industrially Defatted Nondehulled Sunflower Meal", *J. Agric. Food Chem.*, vol. 39, No. 3, pp. 447–450 (1991).

Snyder, H. et al., "Soybean Utilization", Van Nostrand Reinhold Company, New York, XP–002115478, pp. 236–237 (1987).

Tsen, H. et al., "Changes of enzymic activities and biochemical constituents during the fermentation of defatted soybean meal with Rhizopus thailandensis", *Journal of the Chinese Agricultural Chemical Society*, vol. 23, No. 1/2 1 page (1985).

Whitaker, J., "Biochemical Changes Occurring During The Fermentation of High–Protein Foods", *Food Technology*, vol. 32, No. 32, No. 5, pp. 175–180 (May 1978).

METHOD FOR PROCESSING OILSEED MATERIAL

BACKGROUND OF THE INVENTION

The fermentation industry consumes very large quantities of feedstock materials each year. Successful commercial fermentation depends on designing fermentation media containing nutrient sources optimal for microbial growth and product formation. Bioprocess nutrients include sources of carbon, nitrogen, inorganic components, and vitamins. Often complex "natural" sources of nitrogen are chosen which supply not only nitrogen, but also carbohydrate, vitamins, minerals, and other microbial growth factors. Commonly used materials include soybean meal or flour, fish meal, and corn steep liquor. All of these crude naturally derived products have the advantage of being relatively inexpensive compared to complex specialty medium ingredients, such as yeast extracts or highly processed oilseed meals.

Since the crude naturally derived products were not designed for fermentation applications, potential drawbacks to their effectiveness exist. For example, these crude materials contain very little readily-available nitrogen. This limits their use as nitrogen sources in fermentation by microorganisms which do not excrete extracellular proteases, and by microbes that require some readily-available nitrogen for growth in the early stages of fermentation prior to effectively utilizing protein. A common measure of the readily available nitrogen in a nutrient is the amount of free amino nitrogen ("FAN content") of the material. Crude naturally derived materials can also contain significant amounts of insoluble, unusable materials which must be separated from the product of interest and disposed of after fermentation. Finally, since these crude feedstock materials are products of the agricultural and food processing industries, their consistency and/or quality can be variable.

To be an effective nitrogen source in fermentation, protein must generally first be hydrolyzed to its constituent small peptides and individual amino acids. This can be accomplished either during fermentation by proteolytic enzymes excreted by the fermenting microorganism, or provided directly in a pre-digested form as a fermentation medium ingredient. Protein nitrogen in this more bioavailable form is known as free amino nitrogen ("FAN"). FAN is a measure of the quantity of amino nitrogen available during fermentation, and refers specifically to the amount of small peptides, amino acids, and ammonia. Commercial products employed to provide higher FAN in fermentation media include yeast extracts and protein hydrolysates. Potential substrates for hydrolysis include casein or sunflower, rapeseed, soy, meat, and bone meals, and the starting material for the hydrolysis ultimately dictates the composition of the final product.

To supply nitrogen needs in fermentation media, soybean meal and flours are often used in combination with more expensive yeast extracts or soy isolates/concentrates. This combination provides both "readily-available" nitrogen and "slow-release" protein for the duration of the fermentation. The need to supplement crude protein feedstocks with more expensive defined nutrient sources, however, can greatly increase raw material costs.

The latent nutritional values present in many vegetables, particularly the oilseed vegetables such as soybeans and other legumes and cottonseeds, is well known. Utilization of these nutrient sources has been severely hampered, however, by the presence in these vegetable nutrients of naturally occurring substances that can interfere with the growth of organisms. The principal deficiencies of vegetable nutrient sources for use in fermentation media (in addition to low FAN content) are the presence of antinutritional factors such as trypsin inhibitor, lectins and phytic acid. While some of these factors may be reduced to lower levels by heat treatment, such heat treatments are not always effective or desirable.

SUMMARY OF THE INVENTION

The present invention relates to the preparation of high protein content nutrient products from oilseed materials. Defatted oilseed material, such as soybean meal and related defatted soybean products, are particularly suitable for use in producing the modified high protein products of the present invention. As used herein, the term "defatted oilseed material" refers to oilseed material which has been processed to reduce the fat content by at least about 80%. The defatted oilseed material employed in the present process typically has a fat content of no more than about 5 wt. % and preferably no more than about 3.0 wt. % (dry basis).

Table 1 shows a comparison of an illustrative high protein/high FAN nutrient material produced from soybean meal according to the present process. The characteristics of a number of other nitrogen sources, unmodified soybean meal, soy protein concentrate ("SPC"), SoyTone® and a commercial yeast extract, are included in the Table for comparison purposes. The modified soybean meal ("High-FAN Soy") has a protein content, FAN level and protein solubility comparable to that of SoyTone®. The FAN level of the High-FAN Soy is considerably higher than that of SPC (which is comparable to unmodified soybean meal). The phytic acid content of the High-FAN Soy is negligible in contrast to that observed for SPC. The High-FAN Soy also has an extremely low level of soluble sugars similar to what is observed for SPC and yeast extract. In comparison, SoyTone® contains circa 4 wt. % stachyose. High-FAN Soy also has enhanced levels of vitamin $B_1$ and $B_2$ relative to unmodified soybean meal. It is notable that the High-FAN Soy is still a relatively crude unprocessed material (as reflected by the fiber content) in comparison to the highly processed commercial nitrogen sources.

The modified high protein products can be utilized in a wide variety of applications, including the preparation of fermentation media and the production of animal feeds, such as pet foods and related feeds for young animals. One embodiment of the invention provides a oilseed derived high protein material which has a FAN content of at least about 15 mg/g and very low levels of soluble sugars, such as raffinose, stachyose, saccharose.

The present invention also relates to a method for preparing the high protein nutrient from oilseed-based material. The protein content of the modified oilseed material produced by the present method is typically increased by at least about 5 to 10 wt. % relative to the initial unmodified material. Although less preferred, the same method may also be employed using an oilseed flake or meal completely retaining its natural oil constituents. The modified oilseed product is typically produced by a method which includes incubating a culture medium including the oilseed material until the medium has a protein content of at least about 55 wt. %. If the incubation step is carried out for a sufficient amount of time, the FAN content of the modified oilseed product can be quite high, e.g., at least about 15 mg/g and preferably about 20 mg/g or higher. The high protein modified oilseed products produced by the present method generally have low levels of soluble sugars (e.g., raffinose and stachyose) and, if desired, low levels of fat. The fiber content of the high protein modified oilseed products produced by the present method is generally quite similar to the fiber content of the original oilseed material prior to incubation.

In a preferred embodiment of the invention, the incubation of the culture medium is carried out for a sufficient amount of time to produce a high protein/high FAN version of the modified oilseed meal. The attributes of this product, at least about 55 wt. % and typically 60 wt. % or higher protein, FAN levels of 15 mg/g or above and low soluble sugar content make it an attractive material for use as a fermentation feedstock. The present process of modifying an oilseed product typically produces a material which contains substantially reduced levels of antinutritional factors (e.g., trypsin inhibitors) and antigenicity factors. The fiber content and amount of isoflavones in the modified oilseed material are generally relatively close to the corresponding levels present in the original unfermented oilseed material.

For some fermentation applications, it may be advantageous to produce a totally soluble protein source. This may be achieved by extracting soluble material from the biologically modified oilseed material into an aqueous solution. Such an extract typically has an even higher FAN and overall protein level than the crude modified oilseed product. The oilseed derived nutrient which is obtained through such an aqueous extraction is essentially completely soluble in water. As with the modified oilseed product, the extract is generally dried to a moisture content of no more than about 15 wt. % moisture and ground to form a granulated material, e.g., a powder in which at least about 95 wt. % of the particles have a particle size of no more than about 10 mesh. The dried extracts produced in this manner can have an overall protein content of 70 wt. % or higher and FAN contents of about 25 mg/g and above.

DETAILED DESCRIPTION

Figure 1:
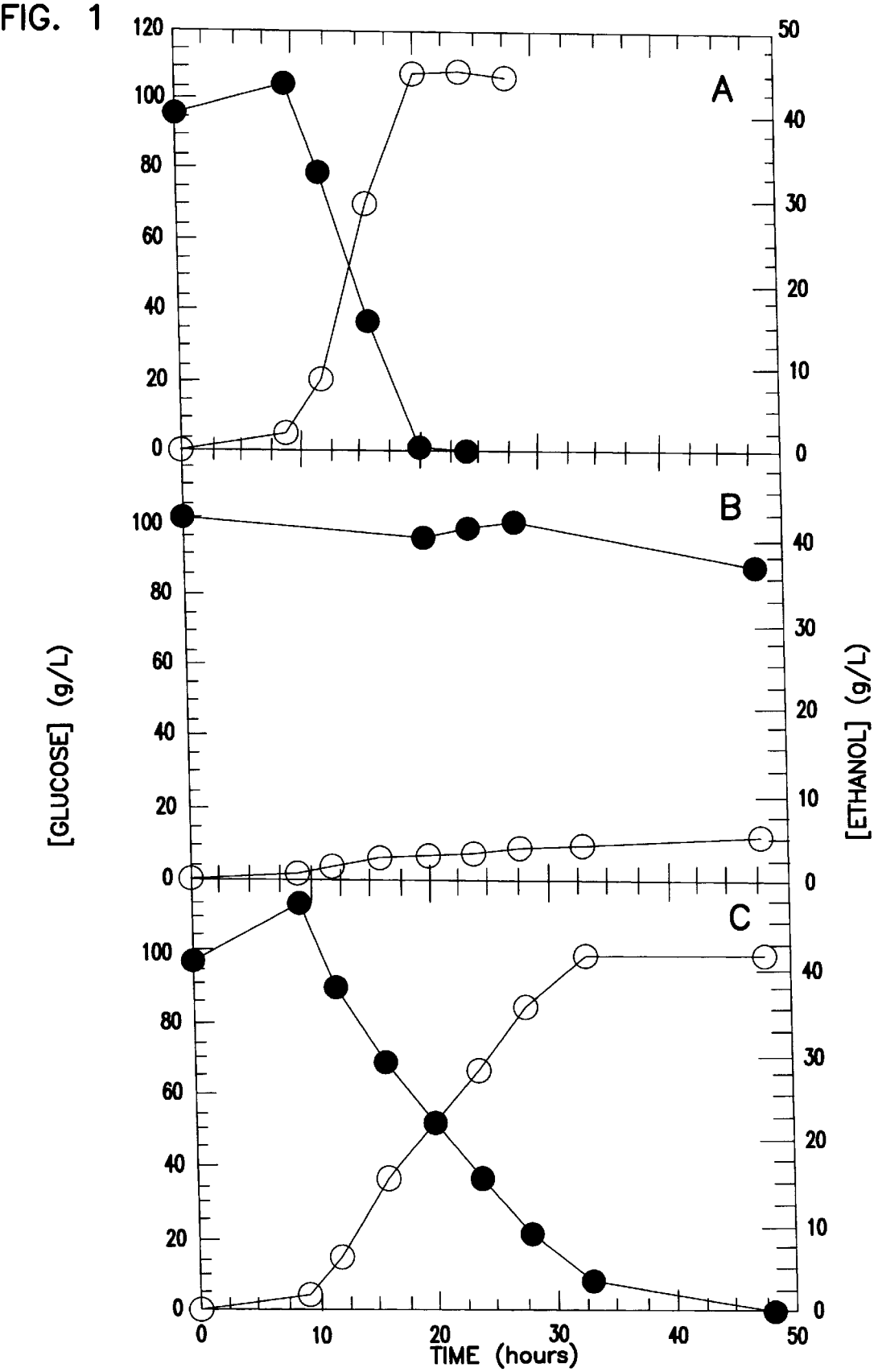
FIG. 1 shows fermentation profiles for *Saccharamyces cerevisiae* cultivated in defined medium with yeast extract (A), soybean meal (B), or SoyTone (C) as the nitrogen feedstock. Glucose (closed symbols) and ethanol (open symbols) were monitored.

To be an effective nitrogen source in fermentation, protein must first by hydrolyzed to its constituent small peptides and individual amino acids. This can be accomplished either during fermentation by proteolytic enzymes excreted by the fermenting microorganism, or provided directly in a pre-digested form as a fermentation medium ingredient. Protein nitrogen in this more bioavailable form is known as free amino nitrogen (FAN). FAN is a measure of the quantity of readily available amino nitrogen, and refers specifically to small peptides, amino acids, and ammonia. Commercial products employed to provide FAN in fermentation media include yeast extracts and protein hydrolysates. Potential substrates for hydrolysis include casein or sunflower, rapeseed, soy, meat, and bone meals, and it is the starting material which ultimately dictates the composition of the final product.

To supply nitrogen needs in fermentation media, soybean meal and flours are often used in combination with more expensive and highly processed sources of readily available nitrogen, such as yeast extracts or protein hydrolysates. This combination provides both "readily-available" nitrogen and "slow-release" protein for the duration of the fermentation. However, the need to supplement crude protein feedstocks with expensive defined nutrient sources, greatly increases raw material costs.

The present invention provides a method of converting oilseed material, such as defatted soybean white flakes or soybean meal, into a high protein content material which has very low levels of soluble sugars (typically no more than about 0.5 wt. %). The modified oilseed material provided by the method is particularly suitable for use as a protein source for incorporation into feed formulations for pets and young animals.

The method includes incubating a culture medium which is made up primarily of oilseed derived material (e.g., at least about 90 wt. % on a dry basis) under aerobic conditions. The incubation is preferably conducted under conditions that allow sporeforming bacteria in the inherent microbial population to dominate the fermentation. The incubation conditions are preferably maintained to favor fermentation by a microbial population that produces a fermentation product having a substantially neutral pH (e.g., a pH of about 6.0–7.5). If conditions are allowed to become anaerobic, lactic acid fermentation by lactobacilli can result in a more acidic end product. This is preferably avoided along with other conditions which would favor yeast fermentation or lactic acid fermentation by lactobacilli. Examples of incubation conditions to be avoided if possible include high moisture content in the culture medium, anaerobic fermentation and other conditions which would favor lower pH fermentation conditions.

It may be advantageous to be able to carry out the fermentation process using solely the indigenous microbial population present in the oilseed material. It has been found that the microbes naturally present in an oilseed material, such as soybean meal, which are capable of producing the desired product of the invention typically include sporeforming bacteria. While the spore forming bacteria have not been completely characterized, it is known that the spores can be activated and used to carry out the present oilseed fermentation even after pasteurization and/or ethylene oxide treatment. If desired, this fact can be used to limit possible contamination by other organisms which are known to be killed by such treatments. While not conclusively established, it is believed that the spore forming bacteria responsible for the present process include Bacillus strains and, likely, strains of *Bacillus subtilis*.

Microbial Inoculum

Alternatively, the material may be inoculated with an isolated source of similar microbes. In commercial production, the use of the latter approach may be preferable as a means of increasing control and reproducibility of process parameters and product specifications. In addition, it has been found that "seeding" the culture medium with a dried seed inoculum (e.g., a portion of oilseed meal previously modified according to the present method) can stimulate the rate of protein increase during the fermentation process. The use of dried "seed meal" is, however, typically associated with a lag period before which the spore-forming bacteria become sufficiently active to promote the biological modification of fresh oilseed material. The initial fermentation rate can generally be stimulated even further if the culture medium is seeded with a "live" microbial source (also referred to herein as a "viable" or "activated" microbial source or as a "live" inoculum). A live microbial source can be conveniently produced by incubating an oilseed material, such as soybean meal, at a temperature of 25° C. to 60° C. and a moisture content of 30 to 60 wt. % for a length of time sufficient to stimulate the growth of spore forming bacteria in the indigenous microbial population of the material. The use of a "live" inoculum can reduce the lag time associated with spore germination leading to a subsequent increase in raising the rate of the protein content of the culture medium. This can significantly reduce the fermentation time required to achieve maximum protein concentration in the medium. Thus, it appears that incorporating a live ("active") seed meal can increase the initial rate of the fermentation process and shorten the overall incubation time necessary to produce a high protein product.

To ensure that the desired microbial population in a "seed inoculum" is selected for, the seed material must be carefully chosen. For example, it has been observed that a dried seed inoculum obtained from soybean meal, which was allowed to ferment with the indigenous microbial population until a final pH of 5.9 was obtained, was inhibitory to the present biological modification process. In contrast, modified soybean meal produced by the present process having a final pH in the range of 7.0 to 7.5 is particularly effective in stimulating the rate of protein increase compared to that observed with unseeded soybean meal. These results confirm that while inoculating the oilseed material prior to processing is desirable, care must be taken in the choice of "seed material" in order to successfully produce an modified soybean meal by the present biological modification method.

If desired, the spore-forming portion of the indigenous microbial population present in oilseed material being fermented according to the present method can be isolated using standard microbiological techniques. The resulting "seed microbial sample" (also referred to as a "seed microbial source") may conveniently be stored in its spore form. As indicated above, it is generally advantageous to activate the seed microbial spores (e.g., via incubation with a small portion of moistened oilseed meal or an appropriate aqueous culture medium) prior to inoculating a culture medium containing fresh unfermented oilseed material.

Source of Oilseed Material

The culture medium employed in the incubation step of the present method generally includes material derived from defatted oilseed material. The fat may be substantially removed from dehusked oilseeds by a number of different methods, e.g., by simply pressing the dehusked seeds or by extracting the dehusked seeds with an organic solvent, such as hexane. The defatted oilseed material which is employed in preferred embodiments of the present process typically contains no more than about 3 wt. % and, preferably, no more than about 1 wt. % fat. The solvent extraction process is typically conducted on dehusked oilseeds that have been flattened into flakes. The product of such an extraction is referred to as an oilseed "white flake." For example, soybean white flake is generally obtained by pressing dehusked soybeans into a flat flake and removing a substantial portion of the residual oil content from the flakes by extraction with hexane. The residual solvent can be removed from the resulting "white flake" by a number of methods. In one procedure, the solvent is extracted by passing the oilseed white flake through a chamber containing hot solvent vapor. For example, residual hexane can be removed from soybean white flakes by passage through a chamber containing hexane vapor at a temperature of at least about 75° C. Under such conditions, the bulk of the residual hexane is volatilized from the flakes and can subsequently be removed, e.g., via vacuum. The material produced by this procedure is referred to as flash desolventized oilseed white flake. The flash desolventized oilseed white flake is then typically ground to produce a granular material ("meal") of which at least about 95 wt. % has a mesh size of about 8 to about 80 and, preferably about 8 to about 40 mesh. If desired, however, the flash desolventized oilseed white flake may be used directly in the incubation step of the present method. The low shear mixing typically employed during the incubation step tends to crumble the flakes into a granulated material having a particle size similar to that of the meal which is produced by grinding flash desolventized oilseed white flake.

Another defatted oilseed derived material which is suitable for use in the present process is derived from material obtained by removing the hexane from the oilseed white flake by a process referred to as "desolventizer-toasting." In this process, the hexane extracted oilseed white flakes are passed through a chamber containing steam at a temperature of at least about 105° C. This causes the solvent in the flakes to volatilize and be carried away with the steam. The resulting product is referred to as toasted oilseed flake. As with flash desolventized oilseed white flake, toasted oilseed flake may be used directly as the culture medium in the incubation step of the present method.

While the desolventized oilseed white flake may be used directly as culture medium in the incubation step, more commonly the desolventized flake is ground to a meal (e.g., where at least about 95 wt. % of the material has a mesh size of about 8 to about 80) prior to being employed as culture medium. Oilseed meals of this type, such as soybean meal, are used in a wide variety of other applications and are readily available from commercial sources. Other examples of oilseed materials which are suitable for use in the culture medium include canola meal, sunflower meal, cottonseed meal, peanut meal, lupin meal and mixtures thereof. Oilseed materials derived from defatted soybean and/or defatted cottonseed are particularly suitable for use in the present method since such material has a relatively high protein content.

Incubation Processing Parameters

It has been found that the efficacy of the present method is enhanced if the aeration, temperature and moisture content of the culture medium are carefully controlled during the incubation process. The fermentation is carried out aerobically. When the culture medium is in the form of a relatively thick bed of oilseed material (e.g., several inches or more thick), it is particularly important the material be mixed sufficiently to allow oxygen-containing gas, typically air, to come into contact with the active microbial population. This is best achieved by mixing the oilseed material in a low shear manner. Preferably, the culture medium is mixed under low shear such that the mixture does not develop into a paste-like material but retains a granular form.

In addition to maintaining access of the active microbial population to air, mixing the culture medium helps to distribute heat and control the temperature of the fermenting material as well as to maintain a relatively uniform moisture content in the medium. The aeration of the incubating oilseed material may tend to dry out the material and lower the moisture content of the incubating material below the desired minimum level of 30 wt. % moisture content. In order to avoid this, a humidified oxygen-containing gas may be passed through the head space of the incubation vessel. The humidified gas is typically moisturized to have relative humidity of at least about 60% and preferably at least about 80%.

It has also been found that if the shear induced by mixing the material is too great (e.g., too high a rate of mixing), the oilseed material tends to "agglomerate" and become more acidic during processing. It is generally preferable to mix the incubating material in a manner which "turns over" the material at a relatively slow rate. In addition, the material does not typically need to be mixed in a continuous fashion in order to maintain the desired aeration, moisture and temperature conditions. Gentle mixing of the incubating material in an intermittent fashion is generally sufficient to aerate the material and maintain temperature and moisture content at desirable levels.

The present fermentation method is typically controlled to maintain a temperature of about 25° C. to about 60° C. and a moisture content (water content as wt. % of the total weight of the culture medium) of about 30 to about 60 wt. %. The fermentation is typically allowed to run in the presence of oxygen for a time sufficient to form a modified oilseed material having a protein content which is at least about 5 wt. % (dry basis) higher than the original unmodified material. Preferably, the modified oilseed material has a protein content of at least about 55 wt. % and more preferably at least about 60 wt. % (dry basis). Where the modified oilseed material produced by the process is to be used as a fermentation medium, the material is generally incubated for a sufficient amount of time to produce a high protein/high FAN material. FAN levels of at least about 15 mg/g and, preferably, about 20 mg/g or higher can be achieved via the present method.

Although the present incubation process may be carried out at relatively low temperatures, e.g., about 30° C. or slightly higher, the fermentation is typically carried out at a temperature of at least about 40° C., and preferably at about 45° C. to about 55° C. There are a number of advantages of operating the fermentation at these temperatures. The chances of complications due to growth of other competing organisms is lessened somewhat at higher temperatures. In addition, at higher temperatures, the reaction generally proceeds at a faster rate allowing more efficient utilization of process equipment. If fermentation is carried out at too high a temperature, however, typically at about 60° C. or above, the growth of the desirable microbial population may be negligible. It may be possible, however, using standard selection techniques to identify mutant spore forming bacillus strains which are capable of growing and effectively carrying out the present microbial modification of oilseed material at temperatures of 55° C. and above.

As noted above, the moisture content of the culture medium is generally maintained at about 30 to about 60 wt. % during the fermentation. Some water must be present in order to prevent the microbial population from going into its spore form. If too much water is present in the medium, however, lactic acid fermentation by lactobacilli can increase and start to lower the pH of the medium. Such a lowering of the culture medium pH can shut down the growth of the desirable portion of the microbial population. It has been found that a oilseed material with a moisture content of about 40 to 50 wt. % is quite suitable as a culture medium for the present fermentation.

Attributes of Modified Oilseed Product

The protein content of the modified oilseed material produced after incubation under the conditions described herein is typically increased by at least about 5 to 10 wt. % relative to the initial unmodified material. The modified oilseed material can include about 55 wt. % protein or more on a dry basis and has a very low soluble sugar level. In a preferred embodiment, incubation is allowed to proceed until the FAN content of the modified oilseed material is at least about 15 mg/g and, preferably, at least about 20 mg/g. The increase in protein content and concomitant decrease in soluble sugar level occurs during the initial stage of the incubation without a substantial increase in FAN content. As noted above, higher FAN levels can generally be obtained by allowing the incubation to proceed for longer periods of time. The total level of soluble sugars, such as raffinose, stachyose, and saccharose, typically decreases relatively rapidly during the incubation such that the soluble sugars make up no more than about 1.0 wt. %, preferably no more than about 0.5 wt. %, and more preferably no more than about 0.2 wt. % of the biologically modified oilseed material (on a dry basis). The reduction in the amount of stachyose in an oilseed material which typically occurs during the present incubation step is particularly notable. For example, the amount of stachyose in a defatted oilseed meal such as soybean meal can be decreased from commonly observed levels of 6–8 wt. % (dry basis) to no more than about 0.5 wt. % and, preferably, no more than about 0.2 wt. % by the present biological modification.

During the incubation step, while the levels of some components of the oilseed material are altered considerably, the ash content, fiber content and total level of phosphorus in the material remain relatively unchanged. Thus, if the oilseed material is substantially made up of material derived from defatted soybean flakes, the modified product obtained from the incubation process typically has an ash content of about 5 to about 7 wt. % (dry basis), and a fiber content of about 2 to about 3.5 wt. % (dry basis). The fat content of the oilseed material also does not generally change substantially during the incubation. For example, incubation of defatted oilseed material, such as soybean meal, can produce a modified oilseed product having a protein content of 60 wt. % or greater and no more than about 3 wt. % and preferably, no more than about 2 wt. % fat. As used herein, the term "fat" refers to triacylglycerols.

The average molecular weight of the protein may be decreased substantially by the incubation process. This is reflected in an increase in the percentage of the protein which is soluble after autoclaving the modified material for 15 minutes. For example, soybean meal typically has a protein solubility (post-autoclave) in a pH 5 aqueous solution of about 15%, and about 65% in pH 7 solution. Modified soybean meal obtained from incubation under conditions that produces a FAN content of at least 15 mg/g generally has a protein solubility after autoclaving of at least about 75% (at pH 5 in an aqueous solution) and at least about 90% in a pH 7 solution.

While the concentration of phosphorus may even increase somewhat from the original level during incubation, the level of soluble phosphorus (as a percentage of total phosphorus) can be increased substantially by the incubation process. For example, soluble phosphorous levels of 80% or higher have been observed in biologically modified oilseed materials having a FAN content of at least about 15 mg/g. The increase in soluble phosphorous generally correlates with a corresponding decrease in phytic acid content. Because of its ability to strongly sequester metal cations via complexation, the presence of too much phytic acid in a fermentation medium can have a deleterious effect on the growth of microorganisms. The present process can produce modified oilseed materials having a phytic acid content of no more than about 0.2 wt. % and preferably no more than about 0.1 wt. % (of the total composition on a dry basis). For example, the level of phytic acid of 1.2–1.5 wt. % typically observed in soybean meal can be reduced to no more than about 0.05 wt. % (dry basis) by the present biological modification (incubation) process.

It has also been established that incubation of an oilseed material, such as soybean meal, under the conditions of the present method can substantially decrease the levels of antinutritional factors in the material. Thus the level of trypsin inhibitors present in an oilseed material such as soybean meal is generally decreased by at least about 75% or more (e.g., from about 4,000 TIU/g to no more than about 1,000 TIU/g, and preferably no more than about 500 TIU/g in the biologically modified oilseed material). The levels of other antinutritional factors, such as soy lectins, soy antigenicity factors and glycinin are also typically substantially reduced during the incubation step.

While the levels of detrimental factors such as these may be substantially decreased, the levels of some beneficial components in the oilseed material are maintained or even increased by the incubation step. For example, the total isoflavone content as well as the amounts of vitamin $B_6$ and vitamin $B_{12}$ are generally maintained at about their original levels after incubation. It has been observed, however, that the amount of vitamin $B_2$ (riboflavin) can be substantially increased by incubation of oilseed material with the indigenous spore-forming bacteria under the present incubation conditions. For example, incubation of soybean meal at about 45° C. and 45 wt. % moisture for a sufficient time to produce a material having a protein content of at least about 60 wt. % and a FAN content of at least about 15 mg/g, can increase the vitamin $B_2$ level from about 2–3 mg/g to 10 mg/g or greater and increase the vitamin $B_1$ level by at least about 50%.

Post Incubation Processing

After forming the modified oilseed product, it is typically advisable to pasteurize the material to ensure that microbial activity is minimized. The modified oilseed product may be pasteurized, e.g., by raising the temperature to 75° C. or above for at least about 10–15 minutes. The material is generally dried to some extent by the pasteurization process. To improve its storage properties, the modified oilseed product is typically dried such that the product contains no more than about 15 wt. % moisture, and preferably, about 8 to about 12 wt. % moisture, based upon the total weight of the final dried product. Preferably, the dried product is then ground into free-flowing solid particles in order to facilitate handling and packaging. For example, the dried, modified oilseed product is typically ground such that at least about 90 wt. % and preferably at least about 95 wt. % of the material is in the form of particles having a size of no more than 10 mesh.

For some applications, it may be advantageous to produce a totally soluble protein source. This may be achieved by extracting soluble material in the biologically modified oilseed material produced by the present method into an aqueous solution. Such an extract typically has an even higher overall protein level than the crude modified oilseed product, while the fiber content of the extract is substantially lower than the crude biologically modified oilseed material. The oilseed derived nutrient which is obtained through such an aqueous extraction is essentially completely soluble in water (e.g., has a solubility in aqueous solution at either pH 5 or pH 7 of at least about 95%). As with the modified oilseed product, the extract is typically dried to a moisture content of no more than about 15 wt. % moisture and ground to form a granulated material, e.g., a powder in which at least about 95 wt. % of the particles have a particle size of no more than 10 mesh. The dried extracts produced in this manner can have an overall protein content of 70 wt. % or higher and FAN contents of about 25 mg/g and above.

The change in FAN content is reflective of an overall decrease in the average molecular weight of the protein in the biologically modified oilseed material (relative to its unmodified precursor). For example, in soybean meal which has been modified by the present method to generate a FAN level of at least about 15 mg/g typically at least about 50 wt. % of the protein has a molecular weight of no more than about 10 kD. The changes in protein molecular weight, sugar content and soluble material as a result of the biological modification of an oilseed material can also influence the viscosity of solutions containing the modified oilseed product. Such changes in viscosity need to be monitored as it can influence the processing and handling requirements of fermentation media which include the modified oilseed product. Due to the increase in soluble material, the present modified oilseed material generally has a higher viscosity than dispersions of soybean meal. In comparison to soy protein concentrate (SPC), the present modified oilseed products have a substantially lower viscosity (see, e.g., Table 1). For example, defatted soybean material which has been modified via the present process to have a FAN content of at least about 15 mg/g and a protein content of 55 wt. % (dry basis) or higher, typically has a post-autoclaved solution viscosity of about 7500 to about 8500 cps (in an autoclaved 20 wt. % solids aqueous solution at pH 7).

To assess the nutritional value and fermentation performance of the present modified soy products, two model fermentation systems were examined. These particular fermentations were selected to represent diverse fermentation processes and products: (1) production of ethanol and (2) tetracycline production. Ethanol is a primary metabolite produced by a yeast under anaerobic conditions at pH 5. Tetracycline is a secondary metabolite produced by a bacterium under aerobic conditions at neutral pH. For comparison, native soybean flour and meal as well as a commercial soy hydrolysate and a yeast extract were included as control nitrogen sources in these fermentations. The results described herein demonstrate the efficacy of the modified oilseed material produced by the present method to serve as an effective nitrogen source in fermentations and, in particular, to serve as an effective nitrogen source in the two model fermentation systems.

Another embodiment of the invention relates to fermentation media which include a high FAN oilseed product produced by the present process. The high FAN oilseed product included in the fermentation media preferably include at least about 60 wt. % protein, a FAN content of at least about 15 mg/g, and no more than about 0.5 wt. % soluble sugars. If the fermentation media includes an extract derived from the modified defatted oilseed material (e.g., defatted soybean flakes), the fiber content of the modified defatted oilseed material is generally quite low (e.g., no more than about 1 wt. %). As noted elsewhere herein, extracts derived from defatted soybean material modified by the present method can have protein content of at least about 70 wt. % and FAN contents of at least about 25 mg/g.

In addition to including the present biologically modified oilseed material as a source of readily available nitrogen, fermentation media typically will include an energy source and/or an additional nitrogen source. Other additives such as additional vitamins, minerals and/or growth factors may also be included in the media. Examples of suitable energy source(s) which may be included in the fermentation media include carbohydrates (e.g., whole or cracked corn, corn starch, wheat midds, wheat flour, whole wheat, barley or rice, corn flour or grits, molasses, glucose syrups, sucrose, starch hydrolysates, and agricultural processing by-products such as corn gluten meal and corn gluten feed), vegetable oil, tallow, and/or lard. Examples of suitable additional nitrogen source(s) which may be included in the fermentation media include hydrolyzed skim milk protein, cottonseed flour and/or meal, soy protein concentrate, soy protein isolate, soy flour, soybean meal, canola meal, sunflower meal, corn steep liquor, wheat gluten, fish meal, yeast extract, yeast autolysate, urea, ammonia, ammonium sulfate, vegetable protein hydrolysate and/or corn gluten feed. For some applications it may be advantageous to include a source of "slow release" nitrogen source (e.g., a "low FAN" protein source such as soybean meal, soy flour or soy protein concentrate) in the media together with a readily available source of nitrogen, such as a modified oilseed material produced by the present process. As used herein the term "low FAN protein source" refers to protein sources which have a FAN content of no more than about 3 mg/g.

Process Equipment and Design

The present method can be carried out using a variety of conventional apparatus of the type generally employed to handle mixtures of solid materials. For example, the original laboratory scale experiments described herein were carried out in open vessels which were capable of being manually mixed (e.g., by "turning over" the material). Fixed bed reactors (e.g., metal trays) can simply be viewed as a larger version of the same type of apparatus. When fixed bed type reactors are utilized in the present method, the bed depth is generally not allowed to exceed more than about 3–4 inches in order to avoid the development of "hot spots" (locations within the bed having a substantially higher temperature—e.g., at least 10° C. hotter—than the average bed temperature) and/or anaerobic fermentation zones within the bed of incubating material.

When fixed bed-type reactors are employed in the present method, the bed of incubating culture medium is typically mixed and turned over on an intermittent basis on some regular schedule, e.g., once an hour. The mixing may be carried out manually, for example on a small scale (e.g., up to about one (1) kg of incubating culture medium) by using a spatula to stir and/or turn over the incubating material. As used herein, the term "stir" refers to a mixing motion which results in material being displaced laterally within the bed but remaining substantially within the same region (interior or exterior) with respect to the surface of the bed. The term "turn over," as employed herein, refers to a mixing motion which results in material being displaced between the interior and exterior of the bed (and vice versa). When the present fermentation is carried out on a larger scale under fixed bed conditions, such mixing may be accomplished using larger metal blades which move in a way with respect to a major axis of the bed.

Whatever manner of mixing is employed, it is preferable that the fermenting culture medium be mixed to allow sufficient exposure to an oxygen-containing gas, such as air (the typical bath gas), to maintain aerobic fermentation conditions. This is best achieved by incubating the culture medium in an apparatus that permits mixing to be carried out in a low shear manner. As discussed above, the amount of shear to which the incubating medium is subjected is preferably not sufficient to transform the material into a paste like consistency.

A variety of reactor configurations including stirred tank reactors, fluidized bed reactors, packed bed reactors may be employed in the present process. The entire reaction may be performed in a single vessel having appropriate mechanisms to control the temperature and aeration of the culture medium as well as having the capability of drying the modified oilseed product. Alternatively, different processing steps may be performed in separate reaction vessels. For example, after combining the culture medium with water in a mixer to achieve the desired moisture level, the moistened material may be transferred to a second vessel to carry out the incubation (see, e.g., FIG. 3). Depending on the process design and equipment capabilities, the incubation product may be dried and ground in one or more additional pieces of equipment.

Advantageous overall choice of equipment and processing will depend, in part, upon selection, among the approaches, of the one which most readily facilitates an overall cost-effective and efficient processing scheme in large scale implementation. The considerations in selecting overall processes relate to design of the system to accommodate a number of objectives including one or more of the following:

1. Maintenance of desired temperature and aeration conditions of the incubating culture medium;
2. Maintenance of the incubating culture medium within a desired particle size range;
3. Maintenance of the incubating culture medium within a desired range of moisture content;
4. Capability of inoculating the oilseed based culture medium prior to incubation with a defined microbial population;
5. Capability of drying the incubation product to a level of no more than about 15 wt. % moisture;
6. Removal of any unwanted gaseous byproducts; and
7. Capability of granulating the dried modified oilseed product to a granular material of desired particle size.

In addition to fixed bed reactors, a number of other conventional apparatus may be utilized to carry out the present method. Suitable examples of such apparatus include plow-type mixer/dryers, desolventizer-toaster dryers, plate dryers, belt dryers, rotary drum dryers, Nauta-type mixers (which include a precessing screw in a conical tank), perforated floor malting chambers and hollow screw processors. Such mixing apparatus are typically capable of heating and maintaining the temperature of the incubating material within a desired range (e.g., about 40 to 50° C.) as well as mixing the material in a low shear manner.

Figure 3:
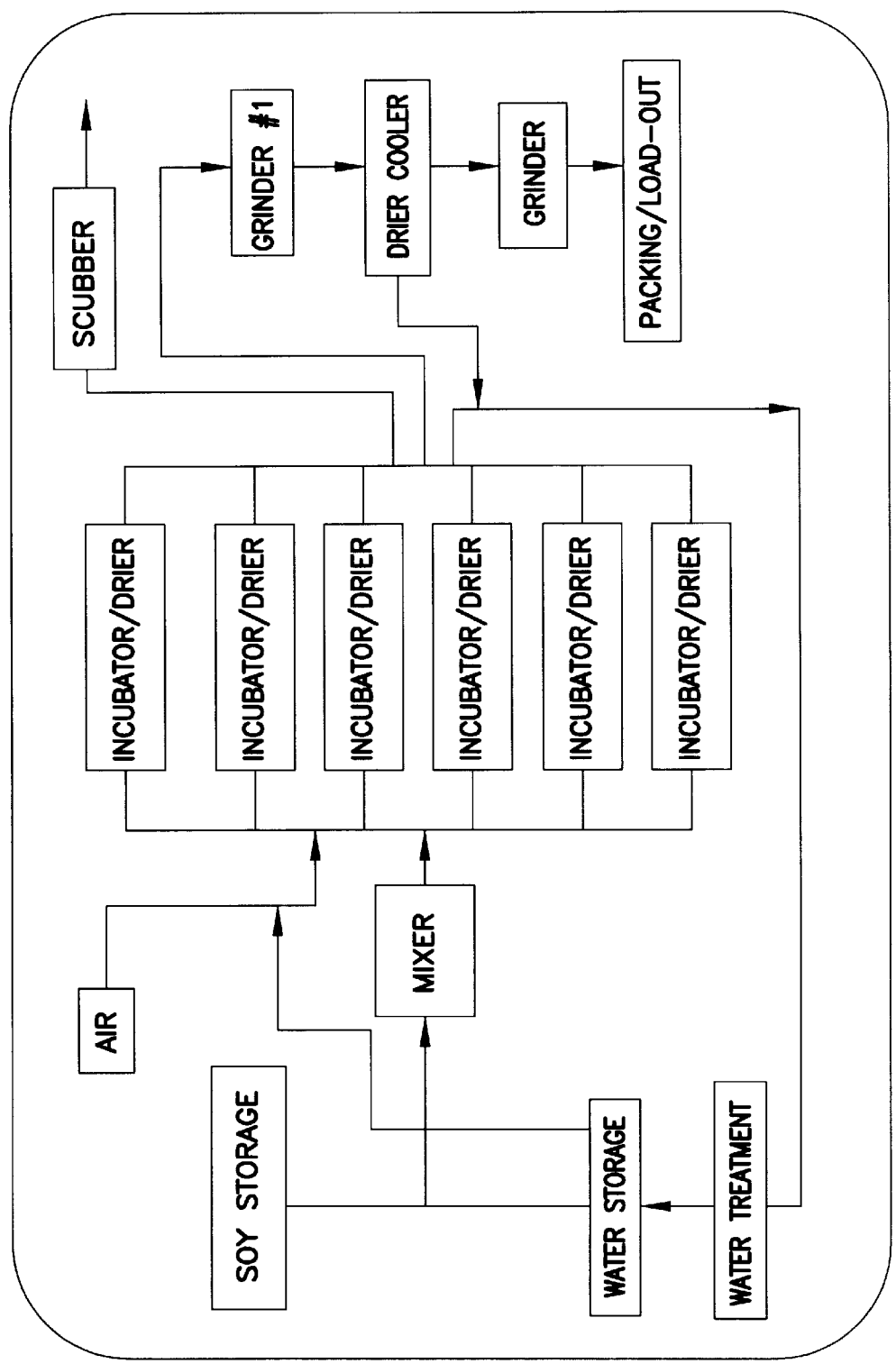
FIG. 3 is a schematic drawing of an exemplary manufacturing process for producing a modified soy meal product according to the present invention.

FIG. 3 shows one example of a system which may be used to produce a modified oilseed material according to the present method. Oilseed material, such as soybean meal, is transferred from a storage section (marked "soy storage") into a mixer together with the appropriate amount of water to produce an oilseed material having a moisture content of about 30 to about 60 wt. %. Once this material has been mixed to a relatively uniform consistency, the moisturized oilseed material is transferred to a set of incubator dryers. While the incubation and initial mixing steps are shown in FIG. 3 as being carried out in separate sections of the system, in some systems the mixing and incubation may be carried out in a single apparatus (e.g., a plow mixer/dryer).

While the moisturized oilseed material is being incubated in the incubator/drier sections of the system, air is typically supplied to the incubator/drier sections (generally in a continuous fashion). The air is preferably humidified, e.g., by spraying a fine mist of water into the flowing air stream. The flow of air through the incubator/drier sections serves to aid in maintaining the fermentation under aerobic conditions as well as preventing the buildup of unwanted gases (e.g., ammonia and other volatile amines) during fermentation. The air flow is generally passed through a scrubber before being vented from the system. To enhance the overall efficiency of the system, water may be recovered from the effluent air and recycled, after treatment to remove any undesirable byproducts of the fermentation, back to the input side of the system (via the water treatment and water storage sections of the system).

In the system shown in FIG. 3, the modified oilseed material produced by the incubation process is typically initially dried in the incubator/drier sections before being subjected to a first grinding step ("Grinder #1"). The partially dried, coarsely ground material is then typically dried further (in the "Drier-Cooler") and subjected to a second grinding step before being packaged for shipping. In some embodiments of the invention, depending on the equipment being employed, at least some portion of the drying and grinding of the incubation product may be carried out in the same portion of the system used for the incubation step (e.g., when a plow mixer/drier is used for the fermentation process). Quite typically, however, partially dried product is transferred to another section of the system to complete the drying process and to grind the dried product to the final desired particle size.

Another suitable process configuration includes a plow reactor. Reactors of this type typically includes a vessel equipped with a mechanism for mixing the incubating the culture medium in a low shear manner. One example of such a reactor includes a cylindrical fermentation vessel containing a screw-type plow blade attached to a shaft positioned along the central axis of the cylinder. The plow blade is preferably can be controlled to rotate in an intermittent fashion at a rotation speed which is sufficient to "turn over" the incubating culture medium without breaking the oilseed material up into particles which form a paste-like material (at the desired water content of about 30 to about 60 wt. % moisture). The shear imparted by the screw-type plow blade is typically sufficient to crumble any oilseed material originally present in the form of flakes (e.g., desolventized oilseed white flakes) into a granulated material having a particle size similar to that of an oilseed meal like soybean meal. For example, after intermittently mixing a culture medium made up from desolventized soybean white flakes for about 8–10 hours in an apparatus of this type, the bulk of the defatted oilseed material is typically broken down into a granular form. The modified oilseed product produced by the incubation process can be pasteurized, dried and granulated to some extent simply by raising the temperature (e.g., to about 75° C.) while mixing the material in a continuous fashion in a higher shear manner that results in the material being broken up into a granulated form.

The invention will be further described by reference to the following examples. These examples illustrate but do not limit the scope of the invention that has been set forth herein. Variation within the concepts of the invention will be apparent.

Analytical Methods
Protein/Free Amino Nitrogen

Protein was analyzed using the Kjeldahl or Leco procedures, or near-infrared (NIR) spectroscopy. Lysine (total and available) was analyzed using standard methodology.

The level of free amino nitrogen (FAN) was determined using the ninhydrin method (see e.g., European Brewery Convention, 1987). Solid samples of oilseed material were extracted with water. In solution, each sample was diluted as needed to obtain 1–3 mg/L FAN. The diluted samples were reacted with a buffered ninhydrin solution in a boiling water bath for 16 min. After cooling in a 20° C. bath for 10–20 min, the samples were diluted using potassium iodate in a water/ethanol solution. Within 30 min of this treatment, the absorbence at 570 nm was measured versus a control solution containing water but otherwise treated like the samples. The FAN level was calculated from a standard line using glycine at various concentrations as the reference.

Protein solubility measurements were carried out by suspending each sample (0.9 g) in 20 mL deionized water and adjusting the pH of the resulting slurries to 5 or 7. The slurries were then autoclaved (121° C., 15 lbs pressure, 15 min), cooled and centrifuged at 20,000×g for 15 minutes. Using the Kjeldahl method, the intact sample and the resulting supernatant were analyzed for protein, and the % soluble protein was calculated.

The viscosity of solutions was determined before and after autoclaving. Solids were mixed with water on a 20% solids (as is) basis and the pH of the resulting compositions were adjusted to 5 or 7. The viscosity of each pH adjusted composition was measured using a Brookfield viscometer. The solutions were then autoclaved at 121° C. (15 lbs pressure) for 15 minutes, cooled to room temperature and the Brookfield viscosity was measured again for the autoclaved material.

Soluble Sugars

Soluble sugars (sucrose, stachyose, raffinose, glucose) were separated and quantified by high-pressure liquid chromatography (HPLC) after aqueous extraction from the sample matrix and appropriate dilution. Soy extracts were prepared by thoroughly mixing 2 g of soy with 20 ml of deionized water in a 50-ml centrifuge tube, and shaking at 300 rpm for 20 min. After 5 min under static conditions, the extracts were centrifuged (3000 rpm; 10 min). An aliquot (4 ml) of each extract was diluted to 10 ml using pure acetonitrile. Following 30 minutes under static conditions, the resulting samples were filtered (0.45 micron), and injected into a Supelcosil™ LC-NH$_2$ column (Supelco, Inc., Bellefonte, Pa.) maintained at room temperature. Sugars were eluted from the column with a mixture of acetonitrile-H$_2$O (75:25), and at a flow rate of 2.5 ml/min. Sugars were detected using a refractive index detector. Known concentrations of commercial samples of each sugar were employed as standards.

Microbiological

Selected samples of modified soybean meal were tested for the presence of pathogens (*Bacillus cereus, Staphylococcus aureus, Clostridium perfringens,* and *Salmonella*), and staphylococcal enterotoxin using standard techniques.

Miscellaneous

Samples were analyzed for phytic acid and trypsin inhibitor by Woodson-Tenent Laboratories, Inc. (Memphis, Tenn.) using standard methodologies. Isoflavone analyses were performed using HPLC and photodiode array detection (Wang et al., *J. Agric. Food Chem.,* 42:1666–1673 (1994)).

EXAMPLE 1

Typical 1–3 g Sample Preparation

One to three grams of soybean meal was weighed into a 9 cm petri dish. Water was added to a weight that will give a moisture level of 45–60%. The moisture was uniformly distributed by mixing with a spatula. The edge of the petri dish was wrapped with Parafilm to reduce moisture loss. The temperature and time at temperature was controlled. Typical conditions were 30–50° C. for three to six days with the sample being mixed and the moisture maintained daily for the first three days and no further adjustment during the remaining days. Once the incubation was judged complete, the temperature than was raised to at least 75° C. for 10 minutes to stop the process. If the sample was not sufficiently dry at this point, the sample was held at 50° C. until dry (<12 wt. % moisture).

EXAMPLE 2

Typical 25 g Sample Preparation

Soybean meal (25 g) is weighed into a 500 ml polyethylene wide-mouth bottle. Water is added to give a moisture level of 45–60%. The bottle is shaken until the water is uniformly distributed throughout the soybean meal. A quarter inch diameter hole is punched in the cap of the bottle. The bottle is placed on its side and a constant but slight agitation is applied using a shaker-incubator. Water is added twice daily to the original level (based on weight) and the sample is mixed by shaking the bottle. The temperature and time at temperature is controlled as with the 1–3 gm size incubations described in Example 1. The 75° C. pasteurization treatment is done in the bottles and the drying at 50° C. is carried out in 15 cm petri dishes.

EXAMPLE 3

Typical One Pound Sample Preparation

One pound of soybean meal is weighed into a 4000 ml Nalgene breaker. Water is added to give a moisture level of 45–60%. The water is uniformly distributed by mixing with a large spatula. The beaker is covered to reduce moisture loss. Water is added daily based on weight loss and remixed with a spatula. The temperature and time at temperature is controlled as describe in Example 1 for the smaller sample sizes. The 75° C. pasteurization treatment and 50° C. drying treatments are carried out after spreading the incubated material out on trays.

EXAMPLE 4

Prototype Production Process Flow

Soybean meal (50,000 kg) may be mixed with 25–30,000 kg water. The mixture is warmed to 40–50° C. with intermittent mixing. The temperature and moisture level are maintained constant for 2–4 days with intermittent mixing. A flow of fresh moist air is provided to maintain an aerobic environment and to flush out any gases (such as $NH_3$) produced during the fermentation. The temperature is then raised to 80° C. and held for 10–30 minutes until pasteurization is achieved. Vacuum is then applied while allowing the temperature of the incubated material to fall to 65–70° C. and maintained at his temperature until the modified soybean material has been dried. The material is then further dried to approximately 12 wt. % moisture by heating at 50° C. The dried material is then typically ground to the desired particle size, e.g., having substantially all (e.g., at least about 95 wt. %) of the material in the form of particles with a size of no larger than about 10 mesh and, preferably, about 100 to about 200 mesh.

EXAMPLE 5

Extract of the Modified Soybean Meal

A modified soybean meal ("High FAN Soy") produced by any of the procedures described in Examples 1–5 may be extracted with water before or after pressure cooking and dried to produce a fully soluble extract with higher FAN content and protein concentration. The extract has a clear solution appearance and a lower fiber content than the original High FAN Soy used to produce the extract. The extract is typically dried, e.g., by flash drying or spray drying, and ground, to form a powdered dried extract.

A 1 g sample of modified soybean meal prepared by the method described in Example 2 was extracted with 70 mL water at room temperature. The protein content, FAN level, overall solubility (at pH 7) and protein solubility at pH 7 after autoclaving a 4.5 wt. % solution of the material for 15 minutes at 121° C. are shown in Table 2 below. For comparison purposes, the properties of unmodified soybean meal, commercial yeast extract and SoyTone® (a highly processed commercial soybean-derived nutrient).

TABLE 2

| Product | Protein (wt. %) | FAN (mg/g) | Solubility (wt. %) | Protein solubility (wt. %) at pH 7 after autoclaving |
|---|---|---|---|---|
| High-FAN Soy | 60 | 25 | 80 | 100 |
| High-FAN Soy Extract | 75 | 31 | 100 | 100 |
| Soybean Meal | 48 | 0.6 | 40 | 70 |
| Yeast Extract | 61 | 43 | 100 | 100 |
| SoyTone$^R$ | 57 | 21 | 100 | 100 |

EXAMPLE 6

Evaluation of Alternate Meals

In addition to soybean meal, samples from two batches each of canola meal and sunflower meal were biologically-modified using only the indigenous microbial flora to produce a high-FAN material. In this experiment, 3-g samples of each meal at 60% moisture were incubated at 30° C. for 3 days. All meals showed a significant increase in FAN to about 7 mg/g after the 3-day treatment; control soybean meal in the same run yielded 10 mg/g after 3 days at 30° C. The fiber content of the modified products was not reduced. The present technology, thus, allows other oilseed meals to be used to produce products from various sources with increased FAN levels. In contrast to the results obtained with the oilseed meals, incubation of corn gluten meal under the same conditions did not lead to an increase in FAN level.

TABLE 3

| Meal | Initial FAN (mg/g) | FAN (mg/g) at 3 days |
|---|---|---|
| Canola (6C1) | 0.75 | 7.1 |
| Canola (6C2) | 0.81 | 7.7 |
| Sunflower (6S1) | 0.41 | 7 |
| Sunflower (6S2) | 0.44 | 5.6 |
| Soybean | 0.76 | 10.0 |
| Corn gluten | 0.7 | 0.26 |

EXAMPLE 7

Type of Microorganism

An attempt to sterilize soybean meal with ethylene oxide was unsuccessful. While ethylene oxide did destroy the majority of viable microorganisms, it did not eliminate the spores. When the ethylene oxide treated soy meal was subject to the usual biological conditions for increasing FAN (i.e., incubation for 6 days at 40° C. and a moisture content of 45 wt. %), it produced a high-FAN product (21.8 mg/g) from which two strains of bacteria were isolated. Initial observations suggest that the two strains are the same as the two strains isolated from previous incubations of soybean meals at 40° C. This is further evidence that the microorganism(s) responsible for FAN generation have been isolated. Based on preliminary assessment, it is believed that the isolated microorganisms are Bacillus strains. Using skim milk agar plates, one isolate was shown to be proteolytic.

EXAMPLE 8

Source of Oilseed Meal

To determine whether soybean meal from varied sources can be used to produce high-FAN soy, a geographic survey of meals produced in a number of locations around the world was undertaken. Soybean meal from a number of geographic locations in the United States and Europe was obtained (in sealed containers which were opened just prior to use). Microbiological analysis revealed that all meal harbored a range of microorganisms, both in terms of levels and type. Using the typical lab-scale fermentation procedure, eight different soybean meals were biologically-modified to produce high-FAN soy. The FAN contents prior to modification ranged from 0.46 to 0.84 mg/g. Following biological modification, these increased significantly; levels ranging from 5.9 to 16.4 mg/g were achieved. This indicates that the microorganism(s) responsible for this biotransformation are widespread, and not confined to one geographic location.

EXAMPLE 9

Preparation of Modified Soy Meals for Use as Fermentation Media

In order to examine the suitability of the products of present method for use in fermentation media, a number of samples of modified soy meals were prepared according to the procedure described in Example 3. The amount of FAN in the various samples is shown in Table 4. The results establish that the present process can be used to produce modified soybean meal which has a FAN content substantially higher than that of unmodified soybean meal or soy flour and comparable to the levels in commercial soy hydrolysates (e.g., SoyTone®). The two fermentation samples which were inoculated with Candida yeast (entries BMS-9b and BMS-9d) prior to incubation did not produce any higher FAN levels than observed with the samples derived solely from incubation of the indigenous microbial population. The two samples, which were inoculated with either Bacillus subtilis culture (BMS-9e) or an inoculum from a prior fermentation (BMS-9f) of soybean meal (incubated with its indigenous microbial population at 60 wt. % moisture and 30° C. for 6 days), produced similar results.

TABLE 4

Characterization of Nitrogen Sources Used in Fermentation Studies.

| Material | FAN (mg/g) | Protein* Solubility pH 5 | Protein* Solubility pH 7 |
| --- | --- | --- | --- |
| Biologically-Modified Soys | | | |
| BMS-9a | 18.5 | 89.7 | 98.3 |
| BMS-9b | 19.5 | 81.2 | 94 |
| BMS-9c | 16.5 | 81.2 | 94 |
| BMS-9d | 16.1 | 85.5 | 94 |
| BMS-9e | 17.7 | — | — |
| BMS-9f | 18.3 | — | — |
| Controls | | | |
| Soybean meal | 0.6 | 17 | 68 |
| Soy flour | 1.1 | — | — |
| Soy Tone | 21.3 | 96 | 98 |
| Yeast extract | 42 | — | — |

*After autoclaving material for 15 min at 121° C.

EXAMPLE 10

Effectiveness of Nitrogen Sources in Model Ethanol Fermentation Nitrogen Sources Soybean meal was obtained from commercial samples (Cargill Protein Products, Cedar Rapids, Iowa). Biologically-modified soys were prepared from soybean meal with or without microbial inoculation according to the procedures described in Example 9. For comparison Soy-Tone® (a commercial soy enzyme hydrolysate) and a commercial yeast extract were included in this study as positive controls (obtained from Difco, Inc., Detroit, Mich.).

Model Ethanol Fermentation

Saccharomyces cerevisiae was revived from the Cargill Culture Collection (#Y8) using yeast extract-maltose ("YM") broth (Difco, Inc.) via incubation at 30° C. (250 rpm). To obtain a standardized inoculum for seed cultures, 35 ml of a 24-h YM broth culture was harvested (3000 rpm; 10 min), and resuspended in 30 ml of fresh YM broth containing 20% (v/v) glycerol. Aliquots (0.5 ml) were stored frozen at −70° C. Initial studies compared the growth and fermentation of glucose by S. cerevisiae in various media. Based on these experiments, the seed and fermentation media shown in Table 5 were selected for routine use. For formulation of the fermentation media, various soy-derived nitrogen sources were added to yield approximately 1.0 g N per liter.

TABLE 5

Composition of Seed and Fermentation Media for Ethanol Production

| Seed Medium | | Fermentation Medium[a] | |
| --- | --- | --- | --- |
| Component | g/L | Component | g/L |
| Yeast Extract | 3 | Glucose | 100 |
| Malt Extract | 3 | Nitrogen source[b] | — |
| Peptone | 5 | $KH_2PO_4$ | 2 |
| Dextrose | 10 | $MgSO_4$—$7H_2O$ | 0.4 |

[a]Initial pH = 5.0.
[b]Nitrogen source added as approximate to yield 1.0 g N/L.

Typically, seed cultures were prepared in 250-ml shake flasks each containing 50 ml of seed medium. Each flask was inoculated with a thawed glycerol stock culture of S.

cerevisiae, and incubated at 30° C. on a rotary shaker (250 rpm) for 24 h. Batch fermentations were conducted in 75 ml of fermentation medium in 250-ml flasks inoculated with 0.3 ml of the washed seed culture. Incubation was at 30° C. on a rotary shaker (100 rpm), and fermentations were monitored at desired intervals for glucose, ethanol, and FAN as described below.

Analysis (i) Glucose/Ethanol

Glucose and ethanol were determined by high-performance liquid chromatography (HPLC). Fermentation broth was filtered through a 0.45 sum nylon filter, diluted 10-fold with 0.01N $H_2SO_4$, and injected into a Bio-Rad Aminex HPX-87H organic acid column (Waters Chromatography, Milford, Minn.) maintained at 60° C. The components were eluted from the column with 0.01N $H_2SO_4$ at a flow rate of 0.5 ml/min. The separated compounds were detected and quantified with a Beckman refractive index detector (Model 156). Known concentrations of compounds were used as standards.

(ii) Sucrose

Sucrose was estimated using a YSI Select Biochemistry Analyzer (Model 2700) (Midwest Scientific Inc., Minneapolis, Minn.). Clear supernatants filtered through 0.45 µm nylon filters were analyzed in 1 ml volumes using 5.0 g/L or 25.0 g/L sucrose solutions as calibration standards.

Ethanol Fermentation—Effectiveness of Nitrogen Source

To maximize ethanol productivity, adequate levels of nutrients must be provided for the yeast in the fermentation medium. Since Saccharamyces yeasts are unable to utilize crude protein as a nitrogen source, the presence of yeast-assimilable nitrogen (FAN) is essential for rapid and complete sugar utilization. FIG. 1 shows a typical fermentation profile in the presence of a commercial yeast extract (9.7% N; 42.3 mg FAN/g)(A) versus soybean meal (7.7% N; 0.6 mg FAN/g)(B), versus SoyTone (9.7% N; 21.3 gm FAN/g) (C). While all of these nitrogen sources have similar levels of total nitrogen, the FAN content varied considerably. Not surprisingly, the higher FAN products (yeast extract and SoyTone) out-performed the low-FAN product (soybean meal), and provided a higher ethanol yield.

The defined fermentation medium (Table 5) was supplemented with each of the nitrogen sources on an equal nitrogen basis, and the fermentations monitored for glucose and ethanol at desired intervals. A series of experiments was performed to evaluate a range of high-FAN soys. Within each experiment the appropriate positive and negative controls were included. For analytical purposes the nitrogen supplements tested were divided into three groups each of which represented a type of product. The groups included:

1) Control: Nine control samples included 3 soybean meal, 2-20PDI soy flour, and 1 each of 90DPI soy flour, 70DPI soy flour, a flour/ANF-1 enzyme control sample, and a meal/Candida control sample.

2) Biologically-Modified Soy: Eighteen biologically-modified samples prepared using various processing conditions.

3) "Commercial" Hydrolysates: Positive control supplements including SoyTone®, and commercial yeast extract.

Independent of the method of preparation, all of the high-FAN soys produced in this project were comparable to the "commercially-available" positive control products in their ability to support ethanol production from glucose. Included as positive controls were yeast extract (42.3 mg FAN/g) and SoyTone® (21.3 mg FAN/g), both of which contain high levels of FAN. Among the high-FAN soys, no significant differences in the mean ethanol yield from glucose was observed between the biologically-modified soys and the commercially available products. Control fermentations using native soy protein (i.e., material which had not been either biologically treated, hydrolyzed or enzymatically treated) did not support ethanol production to any great extent.

Figure 2:
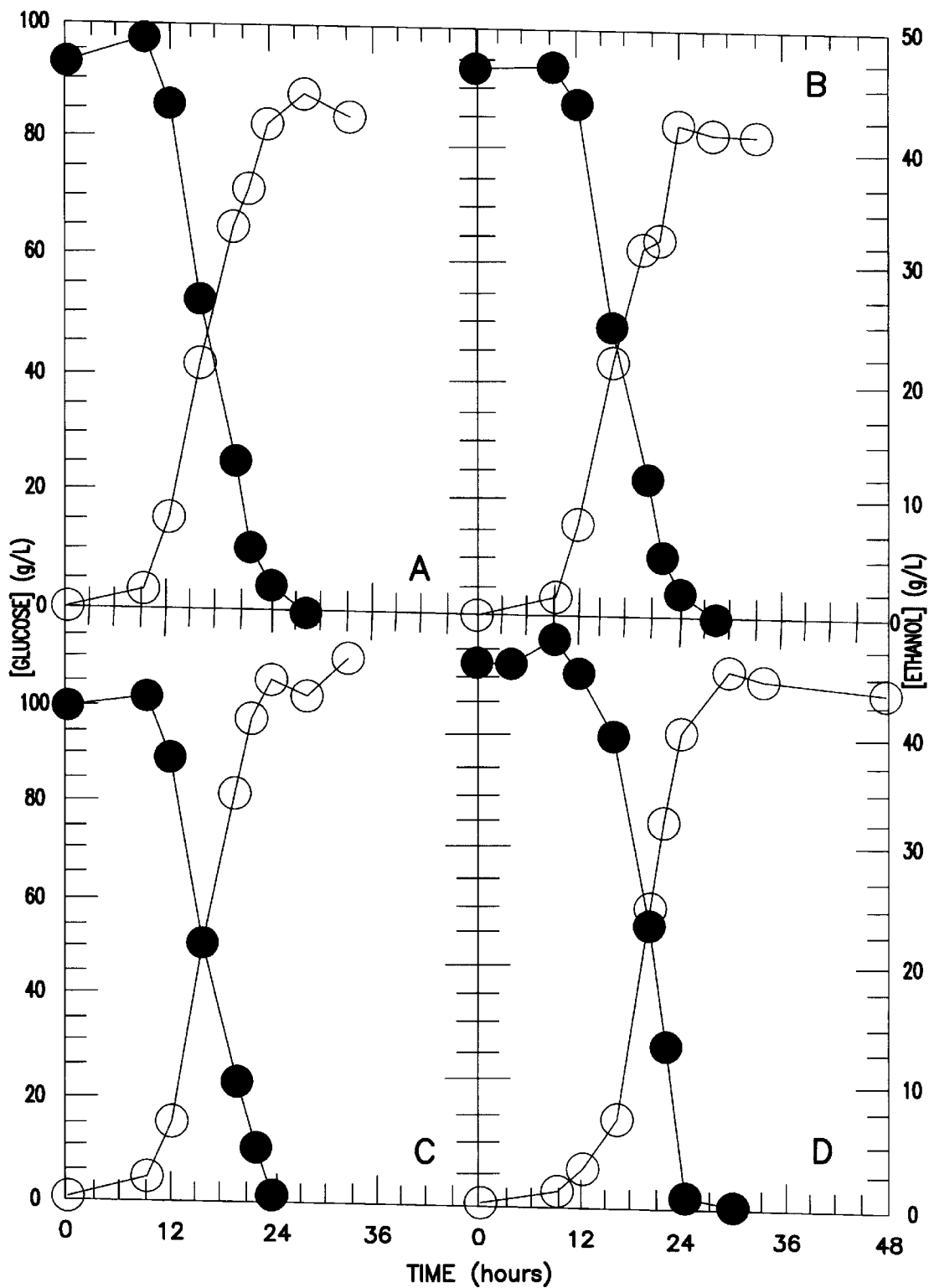
FIG. 2 shows ethanol production by *Saccharamyces cerevisiae* cultivated in a defined medium supplemented with various biologically-modified soys: Soybean meal+water (A), soybean meal inoculated with Candida yeast (B), soybean meal inoculated with Isolate #17-2 (C), and soybean meal inoculated with Bacillus #B3 (D). Glucose (closed symbols) and ethanol (open symbols) were monitored.

Comparison of the fermentation productivity of the yeast cells using various soy-derived nitrogen feedstocks is shown in Table 6. Using yeast extract or SoyTone® as sole nitrogen source, the mean rate of fermentation across seven fermentations was 1.92 g ethanol/L/h. Compared to the positive control products, the biologically-modified soys supported significantly higher yeast fermentation productivity (2.35 g/L/h). FIG. 2 shows representative fermentation profiles for various biologically-modified soy products. For comparison, fermentations were carried out under the same experimental conditions using yeast extract (FIG. 1A), native soybean meal (FIG. 1B), and SoyTone (FIG. 1C) as sole nitrogen sources. Since native soy protein products did not support ethanol production, the rate of fermentation was negligible (0.08 g/L/h).

TABLE 6

Ethanol Production by *Saccharamyces cerevisiae*.

| Nitrogen Source | Ethanol Yield (% of SoyTone[R] Control) | Ethanol Production (g/L/hr) |
|---|---|---|
| Biologically-Modified Soys | 104 | 2.35 |
| Commercial Nitrogen Sources[a] | 100 | 1.92 |
| Soy Acid Hydrolysate | 97 | 1.54 |
| Soy Enzyme Hydrolysate | 95 | 1.08 |
| Soybean Meal/Flour | <10 | 0.08 |

[a]SoyTone[R] and commercial yeast extract.

EXAMPLE 11

Tetracycline Fermentation—Effectiveness of Nitrogen Source

Tetracycline Determination

Tetracycline was measured by reverse phase HPLC (Tsuji et al., Antibodies, 31: 302–308 (1978)). Clear supernatants (0.45 µm) collected as above were diluted as appropriate with 0.01M phosphate buffer (pH 2.2). Samples were injected into a Microsorb MV $C_{18}$ column (Rainin Instruments Co. Inc., Woburn, Mass.) maintained at room temperature. Tetracycline was eluted from the column with a mixture of methanol-acetonitrile-$H_2O$—0.2M phosphate buffer (50:20:20:10) at pH 2.5, and a flow rate of 0.6 ml/min. Tetracycline was detected at 280 nm using a variable UV wavelength detector (Model 486; Waters). Within each experiment, tetracycline hydrochloride (Sigma Chemical Co., St. Louis, Mo.) was used to generate a standard curve. To verify that tetracycline was indeed the sole product of this fermentation, a chlorotetracycline (Sigma) reference standard was also run (data not shown).

Tetracycline Production by *Streptomyces aureofaciens*

*Streptomyces aureofaciens* (ATCC 10762), obtained from the American Type Culture Collection (Rockville, Md.), was allowed to sporulate on a sporulation medium consisting of (g/L): yeast extract 1.0, beef extract 1.0, tryptose 2.0, $FeSO_4$ 0.01, glucose 10.0, agar 15.0, pH 7.2. Agar plates were incubated at 30° C. for 14 days at which point the culture was well sporulated. To prepare a vegetative mycelium suspension, a loopful of the sporulated culture was transferred into 50 ml of sporulation broth in a 250-ml Erlenmeyer flask, and incubated at 30° C. (230 rpm) for 2–4 days. An aliquot (35 ml) of this culture was centrifuged (3000 rpm; 10 min.), and the pellet was resuspended in 30 ml of fresh sporulation broth containing 20% (v/v) glycerol. The resulting mycelium/glycerol suspension was dispensed in 1.3 ml volumes into sterile culture vials, and stored frozen at −70° C. To provide a standard inoculum, one vial was used to inoculated each seed culture flask as described below. Composition of the seed and fermentation media developed for the model tetracycline fermentation is detailed in Table 7.

Seed cultures were prepared in 250-ml shake flasks each containing 50 ml of seed medium and inoculated with a *S. auroeofaciens* glycerol stock culture. The flasks were incubated at 30° C. on a rotary shaker (230 rpm) for 24–72 h, or until the pH dropped to 4.5–5.0. Note that after inoculation the pH of the seed culture dropped and, according to Darken et al., (Appl. Microbiol., 8:46–51 (1960)), a pH in the range of 4.5–5.0 represents the optimum time to seed the fermentation medium. Fermentations were conducted in 500-ml baffled shake flasks each containing 95 ml of fermentation medium, and inoculated with 5.0 ml (5% v/v) of washed seed culture (see Table 6). The fermentation flasks were incubated at 30° C. on a rotary shaker at 230 rpm, and sampled daily for pH, sucrose, and tetracycline.

TABLE 7

Composition of Seed and Fermentation Media for Tetracycline Production.

| Seed Medium | | Fermentation Medium[b] | |
|---|---|---|---|
| Component | g/L | Component | g/L |
| Sucrose | 30 | Sucrose | 27 |
| Soybean meal | 5 | $ZnSO_4 7H_2O$ | 0.03 |
| Sodium citrate | 1 | $NH_4SO_4$ | 4 |
| $NH_4SO_4$ | 3.3 | $CaCO_3$[c] | 4 |
| $MgSO_4 7H_2O$ | 0.25 | Nitrogen source[d] | — |
| $KH_2PO_4$ | 0.1 | | |
| $H_2HPO_4$ | 0.1 | | |
| $CaCO_3$ | 1 | | |
| $MnSO_4 7H_2O$ | 0 | | |
| $ZnSO_4 7H_2O$ | 0.04 | | |
| $K_2CrO_7$ | 0.016 mg | | |
| Acetic Acid | 0.4 ml | | |

[a]Initial pH = 7.8
[b]Prepared with tap water. The pH was adjusted to 6.0 with $H_2SO_4$.
[c]Dried at 150° C. for 2 h.
[d]Organic nitrogen source added as appropriate to yield 0.537 g N/L In contrast to Saccharamyces yeasts, Streptomyces spp. possess the necessary proteolytic enzymes to be able to use crude protein as a source of nitrogen and the tetracycline fermentation is not strictly dependent on available nitrogen (FAN). Typically, in antibiotic fermentations part of the nitrogen is supplied as ammonium ion. However, with ammonium ion as sole nitrogen source tetracycline production is negligible. A model Streptomyces fermentation was developed using sucrose as the carbon and energy source, and a mixture of ammonium sulfate and soybean meal as the nitrogen source ("Soybean Meal Control" in Table 8). Using 30 g/L sucrose, tetracycline was produced to approximately 3000 μg/ml after about 120 hours. Following a short lag, tetracycline production began and continued essentially until depletion of the carbon source. Soybean meal contains 48% protein and 0.6 mg FAN/g, and, as shown here, is an effective nitrogen source for this model fermentation.

When the soybean meal in the basal medium was replaced on an equal nitrogen basis with yeast extract, a much different fermentation profile was observed (see Table 8). Yeast extract was not an effective nitrogen sources for this fermentation. With yeast extract, sucrose was not an effective carbon source for this fermentation. With yeast extract, while sucrose was depleted rapidly (within 72 h), only 1,494 μg/ml tetracycline was produced. This represents a yield of only 47% compared to the soybean meal control. A highly predigested nitrogen source rich in FAN (such as a yeast extract) does not appear to be optimal for this fermentation application.

To determine if a soy-derived combination of FAN and protein would be of value, selected high-FAN soy-based materials were tested. Tetracycline production can be enhanced by providing soy protein in a hydrolyzed form. The results in Table 8 indicate that High-FAN Soys can have a strong positive effect on both productivity (as measured by the rate of tetracycline production) and final yield. Within a column, means designated with the same letter could not be distinguished with α=0.05. Yield increases of up to 60%, and rates of tetracycline production equivalent to more than twice that of the soybean meal control were observed. Of the high-FAN soys, a number were already superior to either commercial SoyTone or yeast extract.

TABLE 8

Tetracycline Production with Selected High-FAN Soys.

| Nitrogen Source[a] | Tetracycline yield (% of control)[b] | Tetracycline specific production (% of control)[c] |
|---|---|---|
| BMS-9a | 128 bcdef | 171 abc |
| BMS-9b | 145 abc | 193 ab |
| BMS-9c | 102 f | 205 ab |
| BMS-9d | 105 ef | 140 bcde |
| BMS-9e | 166 a | 222 a |
| BMS-9f | 54 g | 36 f |
| Yeast Extract | 47 g | 78 ef |
| Soybean Meal Control | 100 f | 100 def |
| SoyTone[R] | 114 def | 115 cde |

[a]The control fermentations included soybean meal as organic nitrogen source.
[b]Yield calculated as μg tetracycline per gram sucrose utilized. % of control = percent of yield as compared to the soybean meal control.
[c]Productivity = rate of tetracycline production during the production phase calculated as μg tetracycline per ml of fermentation broth per hour. % of control = percent productivity as compared to the soybean meal control.

The invention has been described with reference to various specific and preferred embodiments and techniques. The invention is not to be construed, however, as limited to the specific embodiments disclosed in the specification. It should be understood that many variations and modifications may be made while remaining within the spirit and scope of the invention.

TABLE 1

Attributes of "High-FAN SOY" and Various Other Products

| Attribute | Soybean Meal | High-FAN Soy | SPC | Yeast Extract[a] | SoyTone |
|---|---|---|---|---|---|
| Free amino N (FAN) mg/g | 0.6 | 17–23 | 0.3 | 43 | 21 |
| Protein (% as is) | 48 | 59 | 61 | 61 | 57 |
| Protein solubility (% autoclaved) | | | | | |
| at pH 5 | 15 | 95 | 15 | 100 | 100 |
| at pH 7 | 68 | 99 | 67 | 100 | 100 |
| Phytic acid (wt. %) | 1.35–1.74 | <0.02 | 1.5[b] | — | — |

TABLE 1-continued

Attributes of "High-FAN SOY" and Various Other Products

| Attribute | Soybean Meal | High-FAN Soy | SPC | Yeast Extract[a] | SoyTone |
|---|---|---|---|---|---|
| Phosphorous (wt. %) | | | | | |
| Total | 0.87 | 0.73 | — | — | — |
| Soluble | 0.13 | 0.71 | — | — | — |
| Oligosaccharides (wt. %) | | | | | |
| Sucrose | 7.6 | 0.6 | 0.2[c] | 0 | 0 |
| Raffinose | 0.64 | 0 | — | 0.4 | 0.44 |
| Stachyose | 7.67 | 0 | — | 0 | 4.2 |
| B Vitamins (mg/lb) | | | | | |
| B1 | 0.868 | 1.406 | 0.316 | 35 | — |
| B2 | 2.11 | 13.6 | 0.142 | 22 | — |
| B6 | 3.56 | 3.47 | 0.134 | 20 | — |
| B12 | 0.0031 | 0.0054 | 0 | <0.4 | — |
| Viscosity[d] (cps) | 3101 | 8265 | 938000 | ~10 | 9 |
| Fiber (%) | | | | | |
| Crude | 3.15 | 3.91 | — | 0 | 0 |
| ADF | 2.9 | 3.94 | — | 0 | 0 |
| NDF | 7.02 | 6.38 | — | 0 | 0 |
| Fat (% by ether extraction) | 1.32 | 0.72 | — | — | — |
| Trypsin Inhibitor (TIU/g) | 4,100 | <500 | — | — | — |
| Soy Lectins (mg/g) | 0.017 | <0.01 | <0.01 | — | <0.01 |
| Glycinin (mg/g) | 166 | 529 | 0.134 | — | 0.003 |

[a]As an example, approximate analyses for a brewers yeast extract (Amberex 695) according to Red Star Bioproducts product literature.
[b]Estimate based on phosphorous content of soy concentrate (alcohol washed) and lack of any likely hydrolysis method.
[c]Total soluble sugars according to Central Soya product literature.
[d]As an autoclaved 20 wt. % solids aqueous solution at pH 7.

What is claimed is:

1. A method for preparing a modified oilseed material comprising:
   providing a culture medium which includes oilseed material and has a FAN content of no more than 0.84 mg/g; and
   incubating the culture medium at a temperature within the range of about 25° C. to about 60° C. in the presence of oxygen and spore forming bacteria at a pH within the range of about 6.0 to about 7.5 for 3 to 6 days to form a modified oilseed material having a FAN content of at least about 15 mg/g on a dry basis and a protein content which is at least about 5 wt. % higher on a dry basis, than the oilseed material prior to said incubating,
   wherein the culture medium has a water content of about 30 to about 60 wt. %.

2. The method of claim 1 wherein the modified oilseed material has a protein content of at least about 55 wt. % on a dry basis.

3. The method of claim 1 wherein the incubating step comprises intermittently mixing the oilseed material.

4. The method of claim 1 wherein at least about 95 wt. % of the oilseed material has a grain size larger than about 100 mesh.

5. The method of claim 1 further comprising heating the modified oilseed material at a temperature of at least about 75° C. for a sufficient time to form a pasteurized modified oilseed material.

6. The method of claim 5 further comprising drying the pasteurized oilseed material to form a dried modified oilseed material having a water content of no more than 15 wt. %.

7. The method of claim 6 further comprising grinding the dried modified oilseed material to form a granulated modified oilseed material.

8. The method of claim 1 wherein the oilseed material includes defatted oilseed material.

9. The method of claim 8 wherein the incubating step comprises incubating the defatted oilseed material in the presence of an oxygen-containing gas.

10. The method of claim 9 wherein the modified oilseed material has a protein content of at least about 60 wt. % on a dry basis.

11. The method of claim 8 wherein the defatted oilseed material includes toasted oilseed white flake, flash desolventized oilseed white flake or a mixture thereof.

12. The method of claim 8 wherein the defatted oilseed material includes material derived from flash desolventized oilseed white flake.

13. The method of claim 8 wherein the defatted oilseed material includes material derived from toasted oilseed white flake.

14. The method of claim 1 wherein the incubating step comprises inoculating the culture medium with spore forming bacteria.

15. The method of claim 1 wherein the culture medium further comprises a second carbohydrate source, a second nitrogen source or a mixture thereof. wherein the culture medium has a water content of about 30 to about 60 wt. %.

16. The method of claim 1 wherein the modified oilseed material comprises, on a solids basis:
   a) at least about 55 wt. % protein;
   b) a FAN content of at least about 15 mg/g; and
   c) no more than about 0.5 wt. % soluble sugars.

17. The method of claim 16 wherein the modified oilseed material further comprises, on a solids basis:
   d) about 2 to about 7 wt. % fiber.

18. The method of claim 16 wherein the modified oilseed material comprises no more than about 0.5 wt. % soluble sugars selected from the group consisting of raffinose, stachyose, saccharose, and mixtures thereof.

19. The method of claim 16 wherein at least about 75 wt. % of the protein is soluble in a pH of 5 aqueous solution.

20. The method of claim 16 wherein at least about 95 wt. % of the protein is soluble in a pH of 5 aqueous solution.

21. The method of claim 16 wherein the modified oilseed material further comprises at least about 2,000 ug/g riboflavin on a dry basis.

22. The method of claim 16 wherein at least about 50 wt. % of the protein has a molecular weight of no more than about 10 kD.

23. The method of claim 1 wherein the oilseed material comprises soybean material, cottonseed material or a mixture thereof.

24. The method of claim 16 wherein the modified oilseed material comprises no more than about 0.2 wt. % soluble sugars selected from the group consisting of raffinose, stachyose, saccharose, and mixtures thereof.

25. The method of claim 16 wherein the modified oilseed material comprises no more than about 1,000 TIU/g trypsin inhibiting factor.

26. The method of claim 1 wherein the modified oilseed material comprises, on a solids basis:
   a) at least about 70 wt. % protein;
   b) a FAN content of at least about 25 mg/g; and
   c) no more than about 0.5 wt. % soluble sugars.

* * * * *